United States Patent
Chindapol et al.

(10) Patent No.: US 8,204,018 B2
(45) Date of Patent: Jun. 19, 2012

(54) HIERARCHICAL FRAME STRUCTURE FOR OFDMA SYSTEMS WITH RELAY

(75) Inventors: Aik Chindapol, Washington, DC (US); Jimmy Chui, Princeton, NJ (US); Vladimir Marchenko, Darmstadt (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 1029 days.

(21) Appl. No.: 11/933,670

(22) Filed: Nov. 1, 2007

(65) Prior Publication Data

US 2008/0151809 A1    Jun. 26, 2008

Related U.S. Application Data

(60) Provisional application No. 60/855,849, filed on Nov. 1, 2006.

(51) Int. Cl.
*H04B 7/14* (2006.01)
(52) U.S. Cl. .......................... 370/330; 370/436
(58) Field of Classification Search .............. 370/238, 370/315, 316, 208; 455/450, 443, 562.1, 455/447, 449, 452, 455
See application file for complete search history.

(56) References Cited

U.S. PATENT DOCUMENTS

| | | | |
|---|---|---|---|
| 2002/0118781 A1* | 8/2002 | Thomas et al. | 375/347 |
| 2003/0188321 A1* | 10/2003 | Shoff et al. | 725/135 |
| 2004/0209584 A1* | 10/2004 | Bargroff et al. | 455/180.1 |
| 2006/0193280 A1* | 8/2006 | Lee et al. | 370/315 |
| 2007/0202803 A1* | 8/2007 | Miyoshi | 455/11.1 |
| 2008/0075178 A1* | 3/2008 | Lappetelainen et al. | 375/260 |

FOREIGN PATENT DOCUMENTS

EP    1677443    5/2006

OTHER PUBLICATIONS

International Search Report, Jan. 11, 2007.

* cited by examiner

*Primary Examiner* — Pao Sinkantarakorn
*Assistant Examiner* — Anez Ebrahim (57) ABSTRACT

An orthogonal frequency division multiple access (OFDMA) frame for transmitting data between a mobile station and a base station includes a downlink subframe including a region for transferring first data to the base station and second data to a relay station at substantially the same time and frequency, and an uplink subframe.

19 Claims, 9 Drawing Sheets

HIERARCHICAL FRAME STRUCTURE FOR OFDMA SYSTEMS WITH RELAY

CROSS-REFERENCE TO RELATED APPLICATION

The present application is based on provisional application Ser. No. 60/855,849, filed Nov. 1, 2006, the entire contents of which are herein incorporated by reference.

BACKGROUND OF THE INVENTION

1. Technical Field

The present disclosure relates to OFDMA systems and, more specifically, to a hierarchical frame structure for OFDMA systems with relay.

2. Discussion of the Related Art

Figure 1:
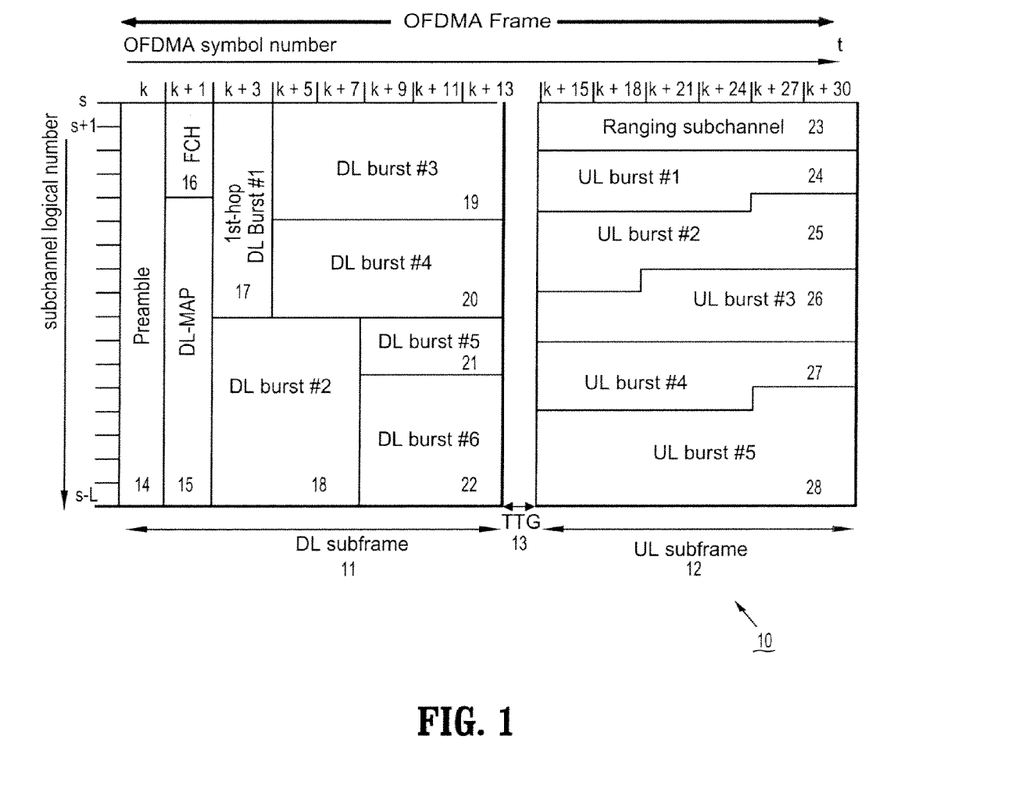
FIG. 1 is a diagram showing an exemplary OFDMA frame.

Orthogonal Frequency Division Multiple Access (OFDMA) is a communication system where multiple users may communicate with a network base station by each communicating over distinct frequency ranges. The structure in which the various users communicate is dictated by a frame that is defined at the base station. FIG. 1 is a diagram showing an exemplary OFDMA frame.

The exemplary OFDMA frame 10 of FIG. 1 is a rectangular frame including a downlink (DL) subframe 11 and an uplink (UL) subframe 12 separated by a switching gap time TTG 13. The frame 10 is divided into a series of symbols, here, numbered k through K+30. Each symbol represents a unit of time. The frame includes a preamble 14 at the first unit of time, k. The preamble spans all available frequencies. The preamble is followed in time by a downlink map (DL-MAP) 15 and a frame check header (FCH) 16 for communicating how the frame is organized. A series of DL bursts 17-22 are included. Each DL burst includes a unit of communication data. Each DL burst is unique in time and frequency so that no two bursts are communicated at both the same time and same frequency. Moreover, each DL burst is communicated in one hop, for example, from a base station (BS) directly to a mobile station (MS) in the downlink (DL) and a mobile station (MS) to a base station (BS) in the uplink (UL).

The UL subframe 12 includes a ranging subchannel 23 occupying the highest frequency subchannels. The UL subframe also includes a series of UL bursts 24-28. As is the case with the DL bursts, each UL burst is communicated in one hop.

Accordingly, FIG. 1 illustrates an example OFDMA frame that may be used, for example, as a typical 802.16e frame structure, although such a frame may be used more generally for any OFDMA system and the number and relative location of the various DL and UL bursts may be changed.

Figure 2:
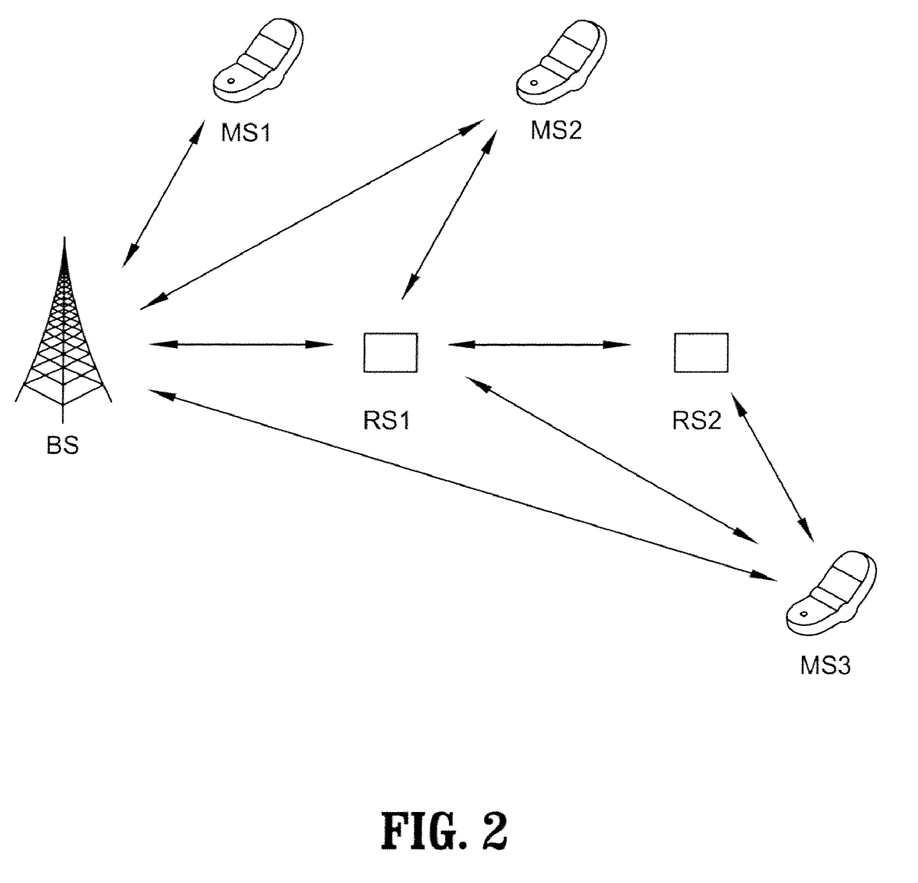
FIG. 2 is a diagram of a mobile network including a base station, a first and second relay station, and a mobile station.

A single hop is defined as a communication that is sent from a source and received directly at a destination without having to be communicated though an intermediary. A relay station (RS) is an example of a common intermediary, and communications that are sent through a single RS are considered to be communicated in two hops. Relay stations may be used to enhance the functioning range and/or signal strength of the base station by allowing for communication through one or more relay stations. FIG. 2 is a diagram illustrating a base station (BS), a first and second relay station (RS1 and RS2), and three mobile stations (MS1, MS2, and MS3). As illustrated, such an arrangement includes many possible links as the mobile stations (MS) may communicate either directly with the base station (BS) or through one or more relay stations (RS).

Conventional OFDMA systems may support multiple hops, for example, up to two hops. Where multiple hops are supported, the frame structure may divide available resources into four distinct zones that can be arranged in any order. A first-hop downlink zone may include downlink communication originating from the base station such as base station to mobile station direct communication and base station to relay station communication. A second-hop downlink zone may include downlink communication from the relay station to the mobile station. A first-hop uplink zone may include uplink communication originating from the mobile station such as the mobile station to base station direct communication and mobile station to the relay station. A second-hop uplink zone may include uplink communication from the relay station to the base station.

However, as mobile communications networks endeavor to provide more data throughput with greater reliability in a communications system including multiple relay stations, conventional approaches to OFDMA framing may fail to deliver optimum performance.

SUMMARY

A system for transmitting information within a communications network includes a mobile station, a base station for providing network access to the mobile station, a relay station for relaying data between the mobile station and the base station, and a scheduler for systematically assigning a transmission region within a frame for transmitting first data along a first data path that includes the relay station and for transmitting second data along a second data path that does not include the relay station. The first data are transmitted at substantially the same time and at substantially the same frequency as the second data are transmitted. The second data may be a different encoded version of the first data.

The system may further include one or more additional relay stations for providing additional data paths through which additional data may be transmitted at substantially the same time and at substantially the same frequency as the first and second data are transmitted.

The frame provided by the frame scheduler may include a first structure for transmitting from the mobile station to the base station and the relay station at substantially the same time and at substantially the same frequency, a second structure for transmitting from the mobile station to the base station and an additional relay station of the one or more additional relay stations at substantially the same time and at substantially the same frequency, and a third structure for transmitting from the mobile station to the relay station and the additional relay station at substantially the same time and at substantially the same frequency.

The communications network may be an orthogonal frequency division multiple access (OFDMA) network and the frame provided by the frame scheduler may be an OFDMA frame.

The frame provided by the frame scheduler may include a structure for transmitting the first data along the first data path and a structure for transmitting the second data along the second data path at substantially the same time and at substantially the same frequency.

The frame structure may be hierarchical and the first data may either be distinct from or substantially identical to the second data.

A method for transmitting information within a communications network includes transmitting first data along a first data path, that includes a relay station, within a frame, and transmitting second data along a second data path, that does not include the relay station, within the frame at substantially the same time and at substantially the same frequency.

Third data may be transmitted along a third data path that includes both the relay station and an additional relay station, within the frame, at substantially the same time and at substantially the same frequency as the first and second data are transmitted.

The communications network may be an orthogonal frequency division multiple access (OFDMA) network and the frame may be an OFDMA frame.

The frame may be provided by a frame scheduler. The transmission of the first data and the transmission of the second data may be performed within a hierarchical structure within the frame. The first data may either be distinct from or substantially identical to the second data.

An orthogonal frequency division multiple access (OFDMA) frame for transmitting data between a mobile station and a base station includes a downlink subframe including a region for transferring first data to the base station and second data to a relay station at substantially the same time and frequency, and an uplink subframe.

The region for transferring first and second data may be hierarchical. The first data may be distinct from or substantially identical to the second data.

An orthogonal frequency division multiple access (OFDMA) frame for transmitting data between a mobile station and a base station includes a downlink subframe and an uplink subframe. The downlink subframe includes a region for transferring first data along a first data path directly between the mobile station and the base station, a region for transferring second data along a second data path between the mobile station and the base station through a first relay station, and a region for transferring third data along a third data path between the mobile station and the base station through a second relay station. The regions for the first, second and third data paths are systematically arranged in such a way that the first data are transferred through the first data path and the second data are transferred through the second data path at substantially the same time and frequency, and the first data are transferred through the first data path and the second data are transferred through the second data path and the third data are transferred through the third data path at substantially the same time and frequency.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE DRAWINGS

In describing the exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide hierarchical framing structure for OFDMA communications in an environment with multiple repeating stations. By using framing structures described herein, communication between a base station and a mobile terminal may be performed directly and indirectly, for example through one or more repeating stations, both at the same time and on the same frequencies. By simultaneously communicating both directly and through the repeating stations, throughput and/or reliability may be increased.

As used herein, the term "simultaneously" refers to communication that is performed both at the same time and at the same frequency or range of frequencies. In known approaches to OFDMA framing, multiple bursts of data may be transmitted within the same time block, for example as seen in FIG. 1. However, as used herein, these bursts of data are not communicated simultaneously because each burst occupies a distinct set of frequency subchannels. Thus simultaneous communication, as used herein, relates to data that is transmitted at the same time block and within the same set of frequency subchannels.

Accordingly, exemplary embodiments of the present invention may exploit relay stations as a way to communicate additional data between the base station and the mobile station. For example, a first portion of data may be communicated directly between the mobile station and the base station while a second portion of data may be communicated through the relay station and then onto the base station. Thus the mobile station, for example, may simultaneously receive data from one or more relay stations and/or a base station. The mobile station may also simultaneously send data to the relay stations and/or the base station. By simultaneously communicating two portions of data along different paths, a higher data throughput may be achieved.

This explanation may be extended to provide for more than two portions of data that are communicated through more than two different paths. For example, there may be three portions of data communicated simultaneously along three different paths. For example, a first path may be a one hop communication between a mobile station and a base station, a second path may be a two hop communication though a relay station and a base station, and a third path may be a three hop communication through a first relay station, a second relay station and the base station.

In the above examples, throughput may be increased by simultaneously sending multiple portions of identical data. Alternatively, multiple copies of the same data may be simultaneously communicated through the two or more multiple paths. Because the same data is simultaneously communicated through multiple paths, the reliability of the communicated data may be increased as there is an increased likelihood that the data will be communicated without error. When the same data is simultaneously communicated through multiple paths, the same data may be coded differently for each path so that it need not be the exact same data that is communicated through multiple paths and it may instead be substantially identical data that has been represented in a different way. Thus exemplary embodiments of the present invention may provide increased reliability. These approaches may therefore be combines and/or selectively applied to provide both increased throughput and increased reliability. By simultaneously communicating distinct data along distinct paths, opportunity for interference may be minimized.

Exemplary embodiments of the present invention may be implemented, for example, by employing a frame scheduler that may define an OFDMA frame as described above. The frame structure may be extended by the scheduler to accommodate any desired number of hops. The scheduler may determine whether it is more desirable to have increased throughput or increased reliability in a given instance and define the OFDMA frame accordingly.

Figure 3:
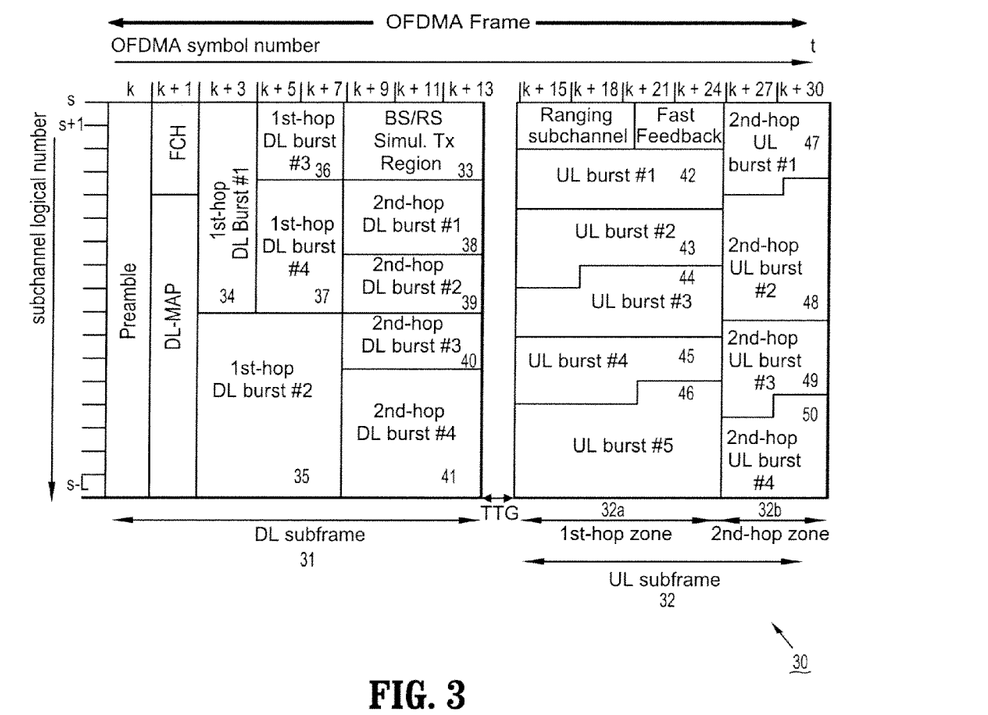
FIG. 3 shows an exemplary implementation of an OFDMA frame structure supporting two hops according to an exemplary embodiment of the present invention.

Simultaneous communication may be performed by including one or more regions within the frame that have a hierarchical nested structure as described in greater detail below. For example, there may be a single region within the DL subframe that provides for BS/RS simultaneous transfer so that a mobile station may simultaneously send data to a base station and a relay station or perform another type of simultaneous communication as described above. FIG. 3 is an exemplary implementation of an OFDMA frame structure 30 supporting two hops according to an exemplary embodiment of the present invention. As can be seen from FIG. 3, the DL subframe 31 includes a region for BS/RS simultaneous transfer 33. Data for simultaneous transfer is located within this region 33. Data received along a first path, here a one hop path where data is received directly from the base station, are located within $1^{st}$-hop DL bursts 34-37. Data received along a second path, here a two hop path where data is received from the base station through a repeater station, are located within $2^{nd}$-hop DL bursts 38-41.

The UL subframe 32 may include a $1^{st}$ hop-zone 32a within which data bursts 42-46 are sent to an uplink along the first path, here the one hop path. The UL subframe 32 may also include a $2^{nd}$ hop-zone 32b within which data bursts 47-50 are sent to an uplink along the second path, here the two hop path.

Figure 4:
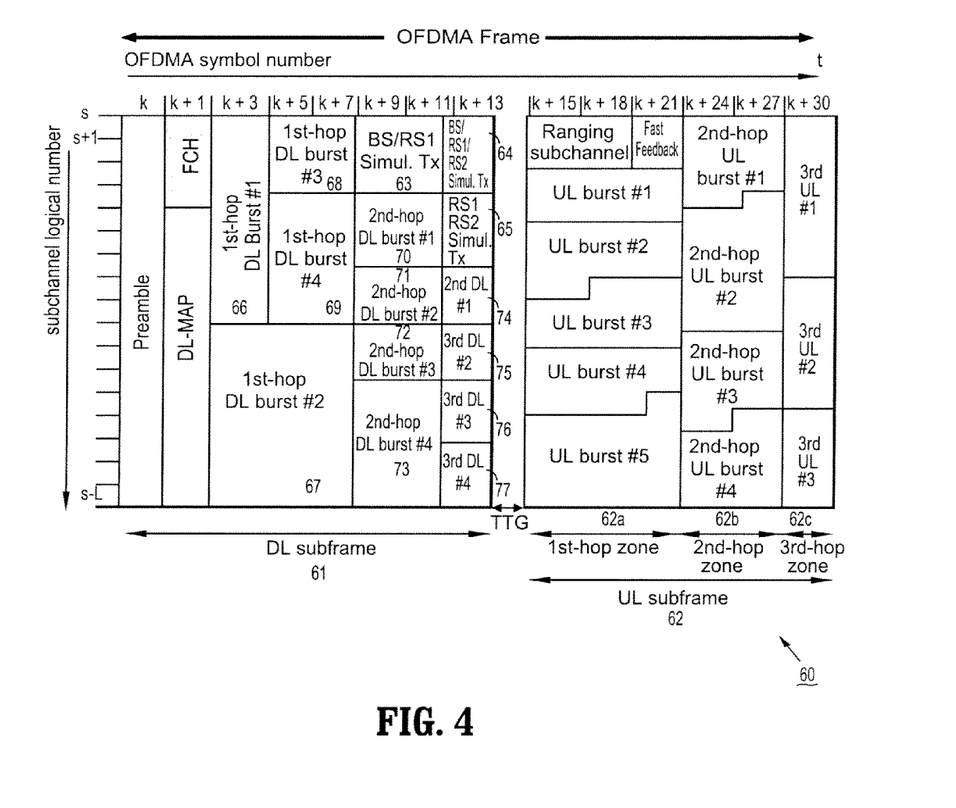
FIG. 4 shows an exemplary implementation of an OFDMA frame structure supporting three hops according to an exemplary embodiment of the present invention.

A similar structure may be used to support more than two hops. For example, FIG. 4 is an exemplary implementation of an OFDMA frame structure 60 supporting three hops according to an exemplary embodiment of the present invention. Here, the DL subframe 61 includes a region for BS/RS1 simultaneous transfer 63, a region for BS/RS1/RS2 simultaneous transfer 64, and a region for RS1/RS2 simultaneous transmission 65. Data received along a first path, here a one hop path, are located within $1^{st}$-hop DL bursts 66-69. Data received along a second path, here a two hop path, are located within $2^{nd}$-hop DL bursts 70-73. Data received along a third path, here a three hop path, are located within $3^{rd}$-hop DL bursts 74-77.

The UL subframe 62 may include a first hop zone 62a within which data are sent to an uplink along the first path, a second hop zone 62b within which data are sent to an uplink along the second path, and a third hop zone 62c within which data are sent to an uplink along the third path.

The description above relates to systems capable of simultaneous communication along multiple distinct paths. Where there are at most two hops, as shown in FIG. 3, there may be two distinct paths and thus two sets of data may be simultaneously communicated. Similarly, where there are at most three hops, as shown in FIG. 4, there may be three distinct paths and thus up to three sets of data may be simultaneously communicated. This description may be extended to encompass systems with any number of hops and thus any number of sets of data that may be simultaneously communicated.

Figure 5:
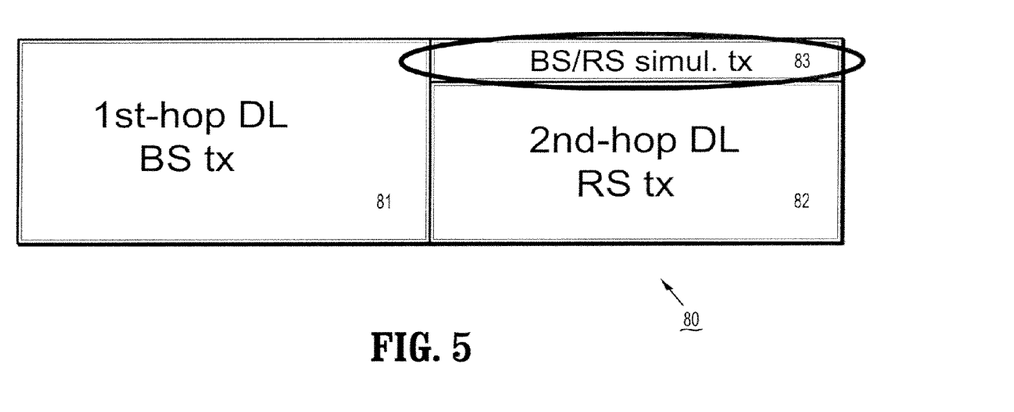
FIG. 5 is a diagram showing a downlink frame structure of nested sets of information for simultaneous transfer according to an exemplary embodiment of the present invention.

Accordingly, the OFDMA frame may include one or more regions of simultaneous transfer. These regions may include nested sets of information thereby providing a hierarchical structure. As shown in the examples above, the regions of simultaneous transfer may be located within the downlink subframe. FIG. 5 is a diagram showing a downlink frame structure of nested sets of information for simultaneous transfer according to an exemplary embodiment of the present invention. The structure 80 includes a section for a $1^{st}$ hop DL 81 to the base station, a $2^{nd}$ hop DL 82 to the repeater station, and an area of simultaneous communications 83 with the BS and RS. Thus the structure 80 of FIG. 5 allows for simultaneous transmission of two sets of data along two distinct paths.

Accordingly, the frame structure may be hierarchical in nature and may allow for flexibility in the number of available data paths. For example, the frame structure may allow for a single data path. The frame structure may also allow for two data paths that may either be transmitted independently in a non-overlapping fashion or simultaneously in an overlapping fashion. The frame structure may also allow for three data paths that may transmit independently, have all three data paths transmit simultaneously, or have either two of the three data paths transmit simultaneously with the remaining data path being transmitted independently.

Figure 6:
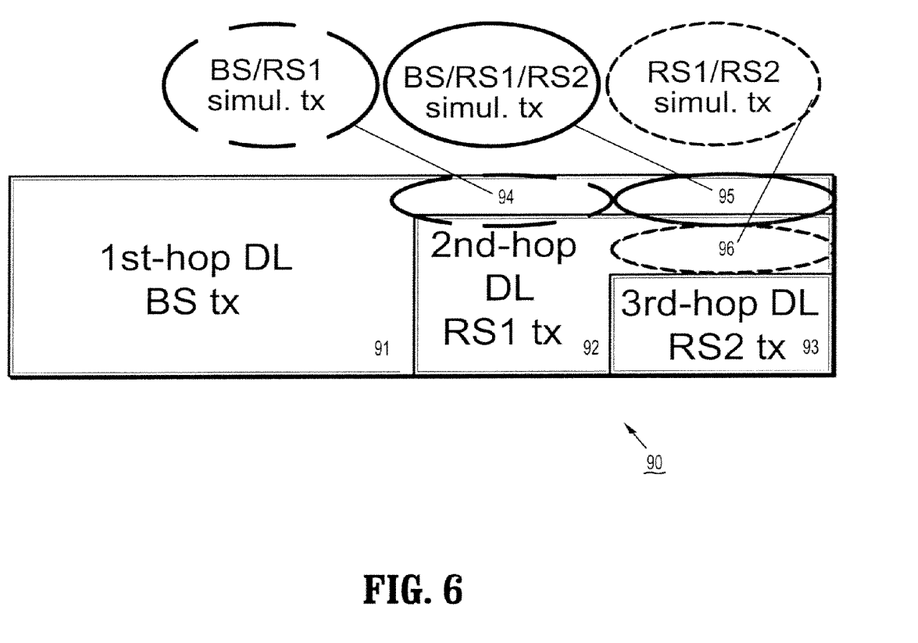
FIG. 6 is a diagram showing a downlink frame structure of nested sets of information for simultaneous transfer according to an exemplary embodiment of the present invention.

FIG. 6 is a diagram showing a downlink frame structure of nested sets of information for simultaneous transfer according to an exemplary embodiment of the present invention. The structure 90 includes a section for a $1^{st}$ hop DL to the base station (BS) 91, a $2^{nd}$ hop DL to a first repeater station (RS1) 92, a $3^{rd}$ hop DL to a second repeater station (RS2) 93, an area of simultaneous communication between BS and RS1 94, an area of simultaneous communication between BS, RS1, and RS2 95, and an area of simultaneous communication between RS1 and RS2 96.

Figure 7:
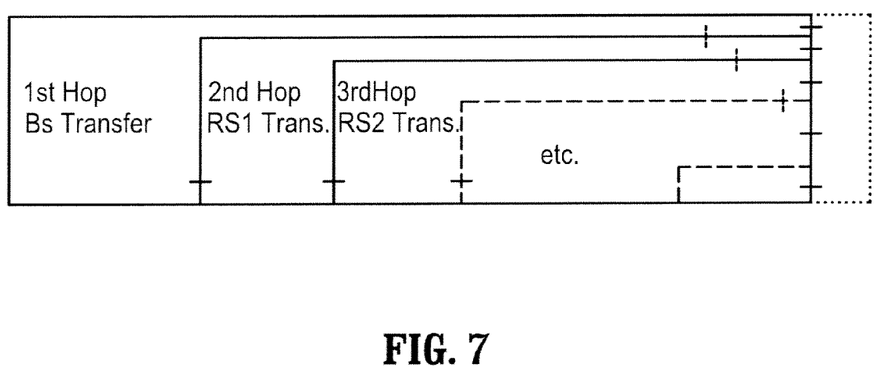
FIG. 7 is a diagram showing a downlink frame structure of nested sets of information for a system having more than three hops according to an exemplary embodiment of the present invention.

The two-hop structure of FIG. 5 and the three-hop structure of FIG. 6 may be extended to accommodate any number of hops and thus simultaneous transmission of any number of sets of data along distinct paths. FIG. 7 is a diagram showing a downlink frame structure of nested sets of information for a system having more than three hops according to an exemplary embodiment of the present invention. This figure generalizes what is shown in FIGS. 5 and 6 to show how the frame structures described above may be applied more generally to a system having any number of hops.

Exemplary embodiments of the present invention discussed above have been explained in terms of an OFDMA system, for example, an OFDMA system conforming to IEEE standard 802.16e. However, the frame structure described above may be applied more generally to other types of communications networks commonly in use or under development. For example, other forms of communications networks utilizing a frame structure similar to the frame structure show in FIG. 1 may be modified in accordance with the present disclosure to allow for simultaneous transmission as described herein.

Figure 8:
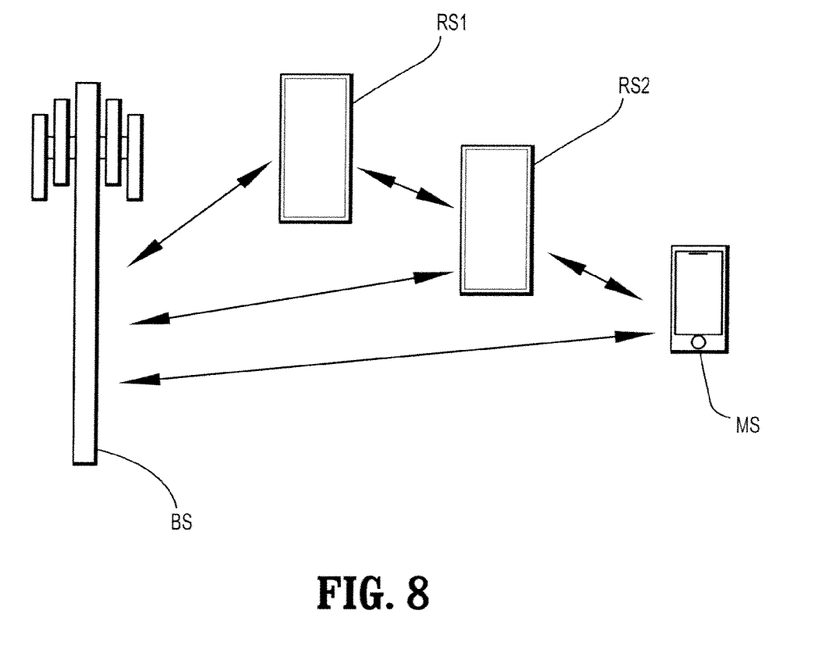
FIG. 8 is a diagram showing a mobile network within which exemplary embodiments of the present invention may be performed.

FIG. 8 is a diagram showing a mobile network within which exemplary embodiments of the present invention may be performed. The mobile network includes a base station BS, a mobile station MS, a first relay station RS1 and a second relay station RS2. Because there are two relay stations shown (three-hop system), there are three different possible paths for communication between the base station and the mobile terminal. For example, communication may be direct between the BS and the MS, communication may travel through one relay station, for example, RS2, or communication may travel though both relay stations, for example, RS1 and RS2. Thus, the use of a frame structure as herein described may allow for the simultaneous transfer of information through three distinct paths resulting in increased throughput and/or increased reliability.

As discussed above, the frame structure herein described may be arranged by a frame scheduler. The frame scheduler may be embodied as a software application running on a computer system that may be located, for example, at the base station or at a remote network faculty.

Figure 9:
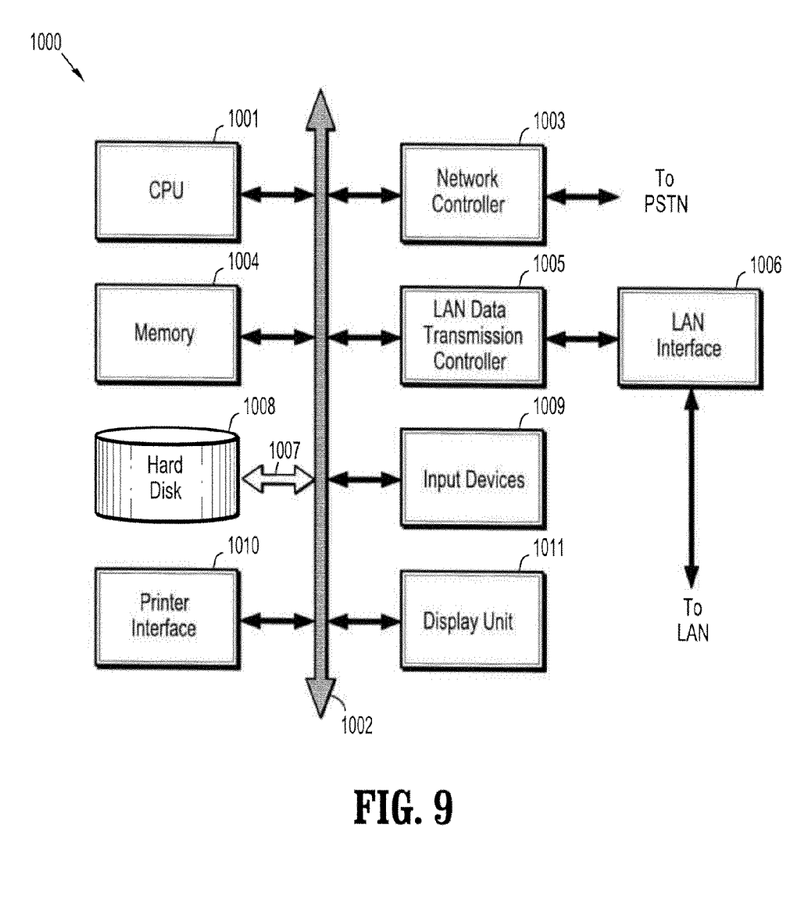
FIG. 9 shows an example of a computer system capable of implementing the method and apparatus according to embodiments of the present disclosure.

FIG. 9 shows an example of such a computer system. The computer system may be, for example, a mainframe, personal computer (PC), computer system-on-chip, server, etc. The software application may be stored on a recording media locally accessible by the computer system and accessible via a hard wired or wireless connection to a network, for example, a digital telephone network.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific exemplary embodiments are illustrative, and many variations can be introduced on these embodiments without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system for transmitting information within a communications network, comprising:
    a base station for providing network access to a mobile station;
    a relay station for relaying data between the mobile station and the base station; and
    a scheduler for providing a transmission region within a frame for:
        transmitting first data from the base station to the mobile station along a first data path that includes the relay station; and
        transmitting second data from the base station to the mobile station along a second data path that does not include the relay station,
        wherein the first data are transmitted at substantially the same time and at substantially the same frequency as the second data are transmitted, and
        wherein the transmission region provided by the scheduler includes a frame structure for transmitting the first data from the base station to the mobile station along the first data path and a frame structure for transmitting the second data from the base station to the mobile station along the second data path at substantially the same time and at substantially the same frequency, the frame structure including:
        a first downlink region for the base station to transmit the first data to the mobile station; and
        a second downlink region, at least partially overlapping frequency resources of the first downlink region and later in time as compared to the first downlink region, for transmitting the second data from the base station to the mobile station and for transmitting a third data from the relay station to the mobile station, wherein the second downlink region provides a shared set of frequency and time resources for the simultaneous transmission of the second data from the base station and the transmission of the third data from the relay station.

2. The system of claim 1, wherein the system further comprises one or more additional relay stations for providing additional data paths through which additional data may be transmitted from the base station to the mobile station at substantially the same time and at substantially the same frequency as the first and second data are transmitted.

3. The system of claim 2, wherein the transmission region provided by the scheduler includes:
    a first structure for transmitting from the mobile station to the base station and the relay station at substantially the same time and at substantially the same frequency;
    a second structure for transmitting from the mobile station to the base station and an additional relay station of the one or more additional relay stations at substantially the same time and at substantially the same frequency; and
    a third structure for transmitting from the mobile station to the relay station and the additional relay station at substantially the same time and at substantially the same frequency.

4. The system of claim 1, wherein the communications network is an orthogonal frequency division multiple access (OFDMA) network and the frame is an OFDMA frame.

5. The system of claim 1, wherein the frame structure is hierarchical.

6. The system of claim 1, wherein the first data is distinct from the second data.

7. The system of claim 1, wherein the first data is substantially identical to the second data.

8. The system of claim 1 wherein the transmission region includes a frame structure that includes a base station/relay station simultaneous transfer region that at least partially overlaps frequency resources of at least a first hop region used by the base station to transmit data to the mobile station, and at least partially overlaps time resources of at least a second hop region.

9. A method for transmitting information within a communications network, comprising:
    transmitting first data from a base station to a mobile station along a first data path, that includes a relay station, within a frame; and
    transmitting second data from the base station to the mobile station along a second data path, that does not include the relay station, within the frame at substantially the same time and at substantially the same frequency;
    wherein a transmission region is provided that includes a frame structure for transmitting the first data from the base station to the mobile station along the first data path and a frame structure for transmitting the second data from the base station to the mobile station along the second data path at substantially the same time and at substantially the same frequency, the frame structure including:
a first downlink region for the base station to transmit the first data to the mobile station; and
a second downlink region, at least partially overlapping frequency resources of the first downlink region and later in time as compared to the first downlink region, for transmitting the second data from the base station to the mobile station and for transmitting a third data from the relay station to the mobile station, wherein the second downlink region provides a shared set of frequency and time resources for the simultaneous transmission of the second data from the base station and the transmission of the third data from the relay station.

10. The method of claim 9, additionally comprising transmitting third data from the base station to the mobile station along a third data path that includes both the relay station and an additional relay station, within the frame, at substantially the same time and at substantially the same frequency as the first and second data are transmitted.

11. The method of claim 9, wherein the communications network is an orthogonal frequency division multiple access (OFDMA) network and the frame is an OFDMA frame.

12. The method of claim 9, wherein the frame is provided by a scheduler.

13. The method of claim 9, wherein the transmission of the first data from the base station to the mobile station and the transmission of the second data from the base station to the mobile station are performed within a hierarchical structure within the frame.

14. The method of claim 9, wherein the first data is distinct from the second data.

15. The method of claim 9, wherein the first data is substantially identical to the second data.

16. A computer system comprising:
a processing unit; and
a memory;
the processing unit and the memory configured to cause a base station to:
transmit first data from the base station to a mobile station along a first data path, that includes a relay station, within a frame; and
transmit second data from the base station to the mobile station along a second data path, that does not include the relay station, within the frame at substantially the same time and at substantially the same frequency;
wherein a transmission region is provided that includes a frame structure for transmitting the first data from the base station to the mobile station along the first data path and a frame structure for transmitting the second data from the base station to the mobile station along the second data path at substantially the same time and at substantially the same frequency, the frame structure including:
a first downlink region for the base station to transmit the first data to the mobile station; and
a second downlink region, at least partially overlapping frequency resources of the first downlink region and later in time as compared to the first downlink region, for transmitting the second data from the base station to the mobile station and for transmitting a third data from the relay station to the mobile station, wherein the second downlink region provides a shared set of frequency and time resources for the simultaneous transmission of the second data from the base station and the transmission of the third data from the relay station.

17. The computer system of claim 16, wherein the processing unit and memory are further configured to cause the base station to transmit third data from the base station to the mobile station along a third data path that includes both the relay station and an additional relay station, within the frame, at substantially the same time and at substantially the same frequency as the first and second data are transmitted.

18. The computer system of claim 16, wherein the communications network is an orthogonal frequency division multiple access (OFDMA) network and the frame is an OFDMA frame.

19. The computer system of claim 16, wherein the transmission of the first data from the base station to the mobile station and the transmission of the second data from the base station to the mobile station are performed within a hierarchical structure within the frame.

* * * * *